United States Patent
Wood et al.

(10) Patent No.: US 10,518,593 B2
(45) Date of Patent: Dec. 31, 2019

(54) TIRE MANAGEMENT SYSTEM AND METHOD

(71) Applicant: Caterpillar Inc., Peoria, IL (US)

(72) Inventors: Gregory Mark Wood, Sinnamon Park (AU); Gregory Davis, Brisbane (AU)

(73) Assignee: Caterpillar Inc., Peoria, IL (US)

( * ) Notice: Subject to any disclaimer, the term of this patent is extended or adjusted under 35 U.S.C. 154(b) by 144 days.

(21) Appl. No.: 15/427,356

(22) Filed: Feb. 8, 2017

(65) Prior Publication Data
US 2018/0222488 A1 Aug. 9, 2018

(51) Int. Cl.
*B60C 23/04* (2006.01)
*G07C 5/00* (2006.01)
*G06Q 10/04* (2012.01)
*G07C 5/08* (2006.01)

(52) U.S. Cl.
CPC ....... *B60C 23/0479* (2013.01); *G06Q 10/047* (2013.01); *G07C 5/00* (2013.01); *B60W 2300/17* (2013.01); *B60W 2530/20* (2013.01); *B60W 2550/40* (2013.01); *B60W 2750/40* (2013.01); *G07C 5/008* (2013.01); *G07C 5/08* (2013.01)

(58) Field of Classification Search
CPC ............. B60W 40/13; B60W 2530/10; B60W 2530/20; B60W 2300/17; B60W 2550/40; B60W 2750/40; B60C 23/02; B60C 23/06; B60C 23/0479; G01G 19/08; G07C 5/08; G07C 5/008; G07C 5/0808; G07C 5/0816; G07C 5/00; G01L 1/00; G06Q 10/047
See application file for complete search history.

(56) References Cited

U.S. PATENT DOCUMENTS

| | | | |
|---|---|---|---|
| 4,773,011 A | 9/1988 | VanHoose | |
| 5,646,844 A | 7/1997 | Gudat et al. | |
| 5,787,378 A | 7/1998 | Schricker | |
| 5,827,957 A * | 10/1998 | Wehinger | B60C 23/0408 73/146.3 |

(Continued)

OTHER PUBLICATIONS

Michelin, Technical Data Book: Earthmover & Industrial Tires, Publication, Feb. 2010, pp. 24-26, Michelin North America, Inc., Greenville, SC, United States.

(Continued)

*Primary Examiner* — Sze-Hon Kong
(74) *Attorney, Agent, or Firm* — Finnegan, Henderson, Farabow, Garrett & Dunner, LLP (57) ABSTRACT

A system for managing a plurality of machines is provided that includes a plurality of machines, each having a control module and a tire sensor associated with a tire on the machine. The tire sensor is configured to measure tire data including at least one of tire temperature and tire pressure. A worksite controller is in communication with each control module, and is configured to generate new travel paths for the machines and selectively communicate the new travel path to each control module. A central processor in communication with the worksite controller receives the tire data and uses it to determine a tire load for each tire, comparing the tire load against a tire rating and determining whether the tire rating will be exceeded. The worksite controller is further configured to alter the current assignment of at least one machine in response to the tire load.

17 Claims, 5 Drawing Sheets

(56) References Cited

U.S. PATENT DOCUMENTS

| | | | |
|---|---|---|---|
| 7,075,421 B1* | 7/2006 | Tuttle | B60C 23/04 |
| | | | 152/152.1 |
| 7,301,445 B2 | 11/2007 | Moughler | |
| 7,398,137 B2 | 7/2008 | Ferguson et al. | |
| 7,693,633 B2 | 4/2010 | Donnelli et al. | |
| 7,934,329 B2 | 5/2011 | Mintah et al. | |
| 7,944,346 B2 | 5/2011 | De Castro et al. | |
| 8,156,048 B2 | 4/2012 | Mintah et al. | |
| 8,190,173 B2 | 5/2012 | Olson | |
| 8,548,741 B2 | 10/2013 | Koehrsen et al. | |
| 8,849,500 B2 | 9/2014 | Gokyu et al. | |
| 8,868,302 B2 | 10/2014 | Everett et al. | |
| 9,053,588 B1* | 6/2015 | Briggs | G07C 5/006 |
| 9,244,464 B2 | 1/2016 | Kini et al. | |
| 2003/0058118 A1* | 3/2003 | Wilson | B60C 23/0423 |
| | | | 340/679 |
| 2003/0216845 A1* | 11/2003 | Williston | B60C 23/003 |
| | | | 701/36 |
| 2004/0017289 A1* | 1/2004 | Brown, Jr. | B60C 23/0408 |
| | | | 340/442 |
| 2005/0102073 A1* | 5/2005 | Ingram, II | B60C 23/003 |
| | | | 701/31.4 |
| 2006/0152352 A1* | 7/2006 | Moughler | B60C 23/04 |
| | | | 340/438 |
| 2008/0281487 A1* | 11/2008 | Milot | B60G 17/0162 |
| | | | 701/38 |
| 2009/0115108 A1* | 5/2009 | Rodgers | B60C 1/0025 |
| | | | 264/331.15 |
| 2010/0180677 A1* | 7/2010 | Katou | B60C 23/04 |
| | | | 73/146.3 |
| 2012/0089293 A1 | 4/2012 | Halder et al. | |
| 2012/0191495 A1 | 7/2012 | McIntosh et al. | |
| 2012/0249319 A1* | 10/2012 | Schumacher | B60C 23/0476 |
| | | | 340/442 |
| 2013/0046418 A1 | 2/2013 | Anderson | |
| 2013/0253814 A1* | 9/2013 | Wirthlin | G01G 19/02 |
| | | | 701/124 |
| 2013/0278406 A1* | 10/2013 | Weston | B60C 23/0488 |
| | | | 340/442 |
| 2014/0067092 A1 | 3/2014 | Cesur et al. | |
| 2016/0009290 A1* | 1/2016 | Benedict | B60W 40/12 |
| | | | 701/34.4 |
| 2016/0059643 A1* | 3/2016 | Infantini | B60C 23/00 |
| | | | 152/415 |
| 2016/0069778 A1 | 3/2016 | Sahu | |
| 2016/0075193 A1* | 3/2016 | Huang | B60C 23/0401 |
| | | | 340/447 |
| 2016/0104124 A1 | 4/2016 | Bullock | |
| 2016/0200153 A1 | 7/2016 | Rothstein | |
| 2016/0202147 A1* | 7/2016 | Svantesson | G01M 17/02 |
| | | | 702/189 |
| 2016/0221582 A1* | 8/2016 | Sudou | B60C 19/00 |
| 2016/0223387 A1 | 8/2016 | Talmaki et al. | |
| 2016/0229234 A1* | 8/2016 | Sudou | B60C 23/0479 |
| 2017/0334290 A1* | 11/2017 | Homsangpradit | B60K 28/08 |
| 2017/0349120 A1* | 12/2017 | Gabaudan | B60C 23/04 |
| 2017/0372611 A1* | 12/2017 | Kodama | B60C 19/00 |
| 2018/0052463 A1* | 2/2018 | Mays | B60T 7/12 |
| 2018/0178797 A1* | 6/2018 | Seaman | B60W 10/184 |

OTHER PUBLICATIONS

Goodyear, Tire Maintenance Manual: Goodyear Off-the-Road, Booklet, Sep. 2008, pp. 63-67, Goodyear Off-the-Road Tires, United States.

Bridgestone, Databook Off-the-Road Tires, Booklet, 2016, pp. 11-12, Off-the-Road Tire Department, Bridgestone Corporation, Tokyo, Japan.

* cited by examiner

TIRE MANAGEMENT SYSTEM AND METHOD

TECHNICAL FIELD

The present disclosure relates generally to a tire management system and method, and more particularly, to a tire management system and method using a tire sensor to monitor tire conditions for work machines.

BACKGROUND

Work machines such as haul trucks, loaders, dozers, motor graders, and other types of heavy machinery are used to perform a variety of tasks that stress the tires of the machine. During these tasks, the tires are subjected to a tire load that depends on the type of task and its duration. Since tire load affects the useful life of the tire, tire load plays a significant role in the life cycle costs of a work machine.

The condition of a tire is affected by many factors. Under normal operating conditions (e.g. excluding damage, operator abuse, poor road maintenance, overloading, etc.), tire load fluctuates based on the type of machine, the current assignment of the machine, and machine's history. Shorter hauls with lighter loads produce lower tire loads, while longer hauls and those with larger haulage produce higher tire loads. Significant machine breaking and cornering also contribute to tire load. Since tire load may lead to increased wear, tire load of a machine must be managed in order maintain optimal tire condition.

Platforms exist for monitoring tire load and tire life for work machines. These platforms include systems for calculating tire load as a function of machine loading and machine speed. More specifically, these platforms calculate a TKPH (Ton Kilometer per Hour) value for each tire, indicating the energy retained in a tire under a sustained workload. TKPH rating is a metric provided by tire manufacturers. A calculated TKPH approximates the work on the tire and is used to compare against the tire's TKPH rating to determine tire condition. Each tire has a TKPH rating and each machine has a combined TKPH rating based on the number of tires on the machine and their type.

One method of managing tires using TKPH is described in U.S. Patent Application Publication No. US 20016/0221582 A1 ("the '582 publication") to Sudou, published Aug. 4, 2016. The '582 publication discloses a tire management system that calculates TKPH using a tire load calculation unit. The tire load is calculated based on a measured load hauled by the machine and the measured speed of the machine.

Although the system of the '582 publication may calculate TKPH in the context of work machines, it fails to retrieve any data directly from the tires of the machine. Rather, the '582 publication uses an indirect calculation to determine the load on each tire. By failing to collect data from the tires themselves, the system of the '582 publication is less accurate than a system that can obtain tire data directly during a machine assignment. The disclosed system is directed to overcoming the one or more of the problems set forth above and other problems in the prior art.

SUMMARY OF THE INVENTION

In one aspect, the present disclosure is directed to a method of managing a plurality of machines that includes receiving tire data associated with a tire sensor on a machine over a network, the tire sensor being associated with a tire on the machine and the tire data including at least one of temperature data and pressure data. The tire data is used to determine a tire load for the tire. Tire load for the tire is compared against a tire rating for the tire. The method further includes determining whether the tire rating will be exceeded on a current assignment, and altering the current assignment of the machine in response to the tire load.

In another aspect, the present disclosure is directed a system for managing a plurality of machines that includes a plurality of control modules, a tire sensor, a central processor, and a worksite controller. The plurality of controls modules is associated with one of the plurality of machines. The tire sensor is associated with a tire on each of the plurality of machines and measures tire data including at least one of tire temperature and tire pressure. The worksite controller is in communication with the plurality of control modules. The worksite controller is configured to generate a new travel path for the plurality of machines between a first location and a second location, and selectively communicate the new travel path to each of the plurality of control modules. The central processor is in communication with the worksite controller and is configured to receive the tire data and use the tire data to determine a tire load for each tire, compare the tire load for each tire against a tire rating, and determine whether the tire rating will be exceeded on a current assignment. The worksite controller is further configured to alter the current assignment of at least one of the plurality of machines in response to the tire load.

In yet another aspect, the present disclosure is directed to a method of managing a plurality of machines that comprises receiving tire data associated with a tire sensor on a machine over a network, the tire sensor being associated with a tire on the machine and the tire data including at least one of temperature data and pressure data. The tire data is used to determine a tire load for the tire by comparing at least one of the temperature data to a map of tire load versus tire temperature and ambient temperature, and the pressure data to a map of tire load versus tire pressure and ambient pressure. The tire load is a ton kilometer per hour (TKPH) value. The method further includes comparing the tire load for the tire against a tire rating for the tire, determining whether the tire rating will be exceeded on a current assignment and altering the current assignment of the machine in response to the tire load.

DETAILED DESCRIPTION

Figure 1:
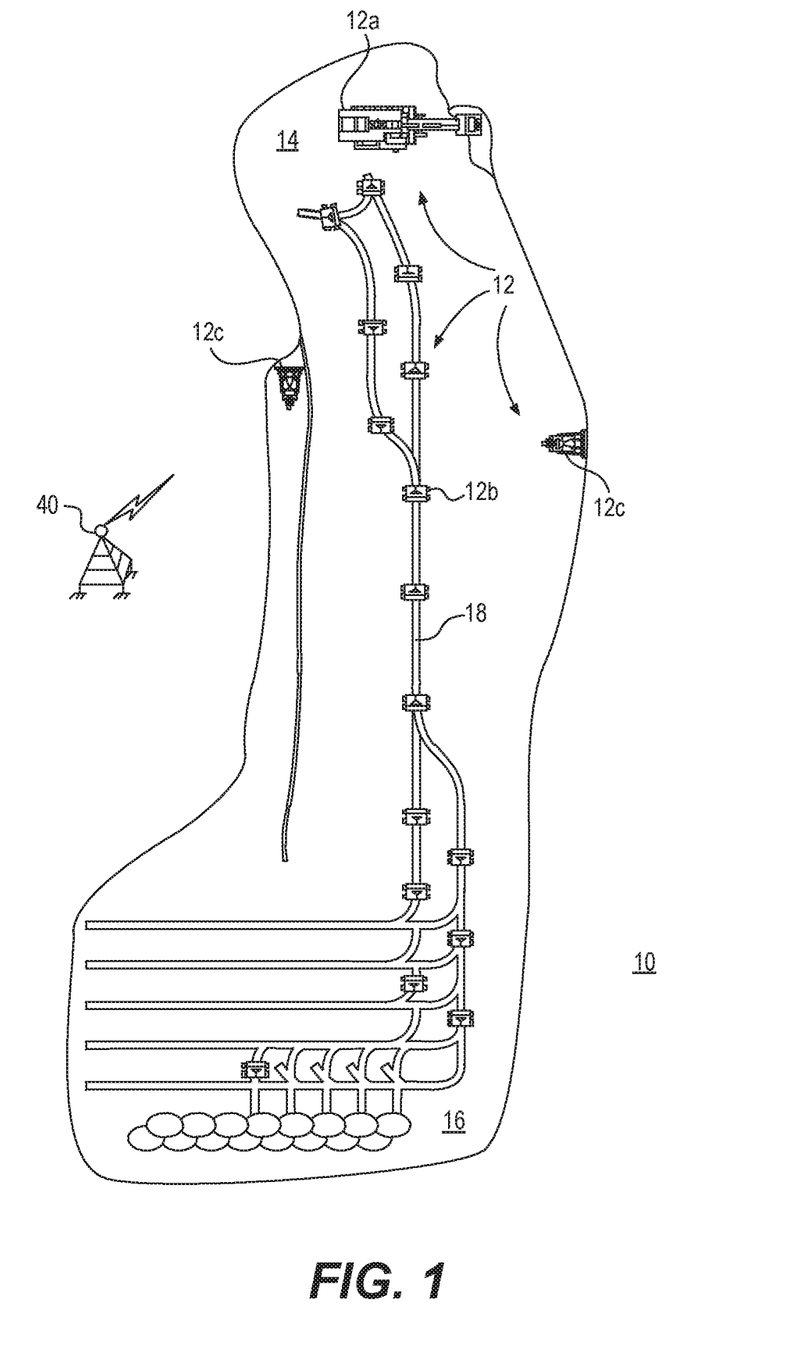
FIG. 1 is an illustration of an exemplary disclosed worksite.

FIG. 1 illustrates an exemplary worksite 10 having multiple, simultaneously-operable machines 12 performing a variety of predetermined tasks. The worksite 10 may include, for example, a mine site, a landfill, a quarry, a construction site, or any other type of worksite known in the art. The predetermined tasks may be associated with altering the current geography at worksite 10 and include various assignments, including clearing operations, leveling operations, hauling operations, digging operations, loading operations, dumping operations, or any other type of work machine operation.

The worksite 10 may include multiple locations designated for particular purposes. For example, a first location 14 may be designated as a load location, at which a mobile loading machine 12a or other resource operates to fill multiple mobile haul machines 12b with material. A second location 16 may be designated as a dump location, at which haul machines 12b discharge their payloads. One or more travel paths 18 may generally extend between the first location 14 and the second location 16.

Any number and types of machines 12 may simultaneously and cooperatively operate at the worksite 10. For example, a loading machine 12a (e.g., an excavator shown in FIG. 1) may be stationed at the first location 14 and assigned to fill a haul machine 12b (e.g., a haul truck) with material. A third type of machine 12c (e.g., a dozer, a motor grader, a water truck, and/or a service vehicle) may be tasked with traveling up and down travel paths 18 to condition travel paths 18, to clean up load and/or locations 14, 16, and/or to service other machines 12 at any location of worksite 10. Machines 12 may be self-directed machines configured to autonomously traverse the changing terrain of worksite 10, manned machines configured to traverse worksite 10 under the control of a local or remote operator, or hybrid machines configured to perform some functions autonomously and other functions under the control of an operator.

Haul machines 12b may follow a travel path 18 that generally extends between the first and second locations 14, 16. One or more additional mobile dozing, grading, or other cleanup machines (e.g., the third type of machine 12c) at the worksite 10 may be tasked with clearing or leveling the first location 14, second location 16, and/or travel path 18 such that travel by other machines 12 at these locations may be possible. As machines 12 operate at worksite 10, the shapes, dimensions, and general positions of a load location, a dump location, and a travel path 18 may change. In a disclosed embodiment, at least some of machines 12 at worksite 10 are autonomously controlled.

Figure 2:
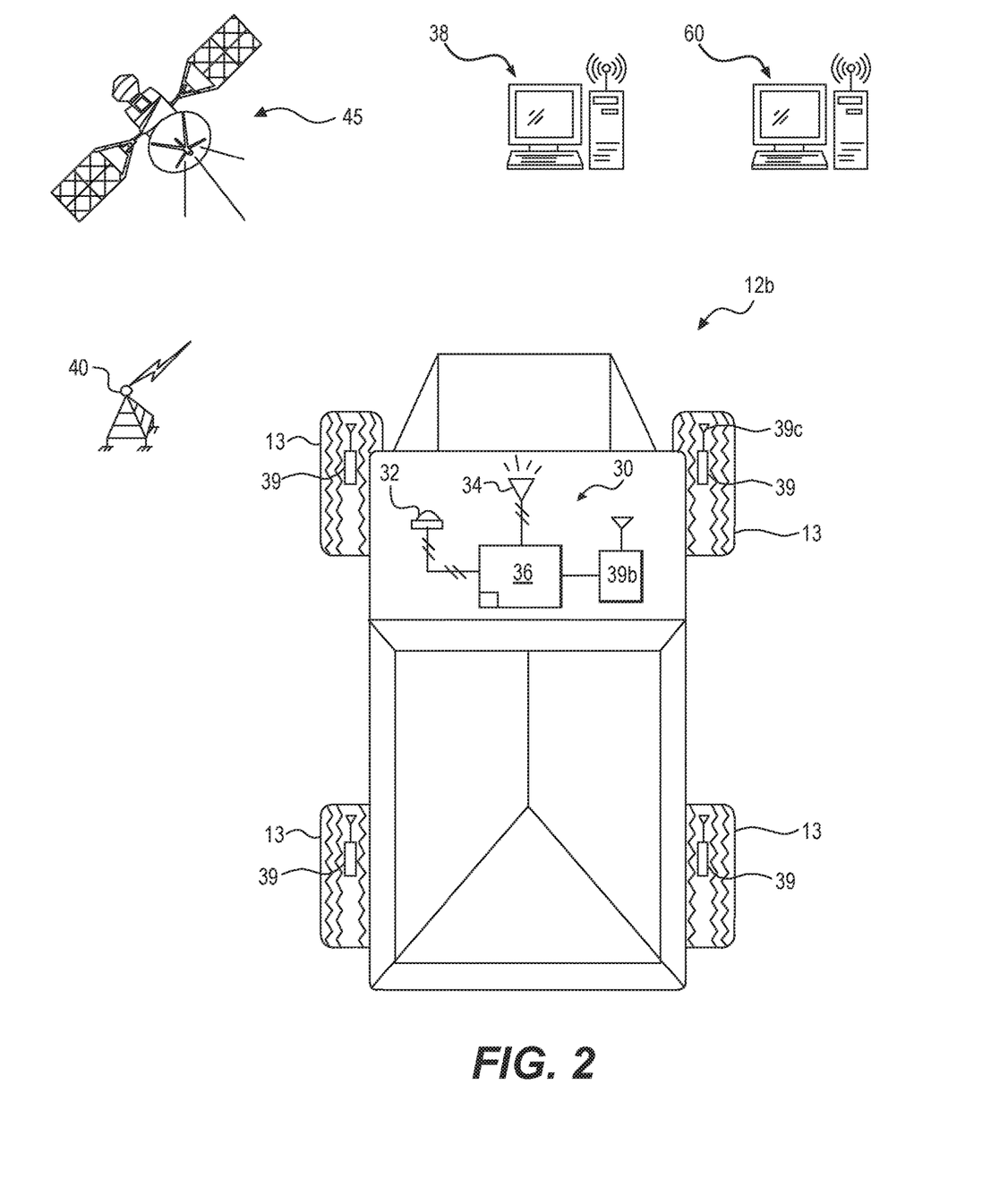
FIG. 2 is an illustration of an exemplary disclosed system that may be used to manage machines at the worksite of FIG. 1.

As shown in FIG. 2, each haul machine 12b may be equipped with a control module 30 that facilitates or enhances autonomous and/or human control of machine 12. The control module 30 may include, among other things, a locating device 32, a communicating device 34, and an onboard controller 36 connected to the locating device 32 and communicating device 34. When intended for use with a manually operated machine, control module 30 may additionally include one or more operator interface devices. Operator interface devices may include, for example, an input device such as a joystick, keyboard, steering wheel, pedal, lever, button, switch, etc. Alternatively or additionally, operator interface devices may include a display device, such as a monitor, if desired.

The locating device 32 may be configured to determine a position of haul machine 12b fat worksite 10 and generate a signal indicative thereof. Locating device 32 could embody, for example, a Global Positioning System (GPS) device, an Inertial Reference Unit (IRU), a local tracking system, or any other known locating device that receives or determines positional information associated with haul machine 12b. The locating device 32 may be configured to convey a signal indicative of the received or determined positional information to onboard controller 36 for processing. It is contemplated that the location signal may also be directed to one or more of interface devices (e.g., to the monitor) for display of machine location in an electronic representation of worksite 10, if desired.

Communicating device 34 may include hardware and/or software that enables sending and receiving of data messages over a wireless communication link 40. The wireless communication link 40 may include a Global Navigation Satellite System (GNSS) 45, cellular, or other alternative data link that enables data to be wireless transmitted from the onboard controller 36 to the worksite controller 38 over a network. The locating device 32 on each machine 12 is configured to monitor movements of the particular machine 12 and generate corresponding location signals. The location signals may be directed to the onboard controller 36 and/or worksite controller 38 for comparison with an electronic map of worksite 10 and for further processing. The further processing may include, among other things, determining a current location of each machine 12; determining a distance between machines 12; determining boundaries of travel paths; determining speed of the machine 12; and/or determining projected or assigned travel paths 18 of the machine 12.

The communicating device 34 may facilitate communication between the onboard controllers 36 and/or between onboard controllers 36 and worksite controller 38. This communication may include, for example, the coordinates, speeds, and/or travel paths 18 of the machines 12 generated based on signals from locating device 32. The communication may also include notification of travel path boundaries, and/or identification of particular travel paths that have been authorized for use by certain machines 12. Data messages may be sent and received via a wireless communication link 40. The wireless communications may include satellite, cellular, infrared, and any other type of wireless communications that enable communicating device 34 to exchange information between worksite controller 38 and onboard controllers 36.

The data messages associated with control system 30 may also be sent and received via a direct data link, as desired. The direct data link may include an Ethernet connection, a connected area network (CAN), or another data link known in the art. The wireless communication link 40 may include satellite, cellular, infrared, and any other type of wireless communications that enable communicating device 34 to exchange information between worksite controller 38 and the components of control module 30.

Based on information from locating device 32 and instructions from worksite controller 38, each onboard controller 36 may be configured to help regulate movements and/or operations of its associated haul machine 12b (e.g., direct movement of associated traction devices, brakes, work tools, and/or actuators; and operations of associated engines and/or transmissions). The onboard controller 36 may be configured to autonomously control these movements and operations or, alternatively, provide instructions to a human operator of haul machine 12b regarding recommended control. The onboard controller 36 may also be configured to send operational information associated with components of haul machine 12b offboard to the worksite controller 38 via the communicating device 34, if desired. This information may include, for example, the coordinates of haul machine 12b, a traction device speed and/or orientation, tool and/or actuator positions, status information, and other information known in the art.

The onboard controller 36 may embody a single or multiple microprocessors, field programmable gate arrays (FPGAs), digital signal processors (DSPs), etc., that include a means for controlling operations of haul machine 12b in response to operator requests, built-in constraints, sensed operational parameters, and/or communicated instructions from the worksite controller 38. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The worksite controller 38 may include any suitable means for monitoring, recording, storing, indexing, processing, and/or communicating various operational aspects of the worksite 10 and each haul machine 12b. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

The worksite controller 38 may be configured to execute instructions stored on computer readable medium to perform methods of travel path planning and control for the machines 12 at the worksite 10. That is, as described above, the operation of machines 12 may cause changes to the geography of worksite 10 and, in order for machines 12, particularly those machines that are autonomously controlled, to adapt to the changing geography, travel path plans for machines 12 should also change to keep up with the changes in terrain. The worksite controller 38 may execute the instructions to perform a method of planning that generates assignments for each machine 12. These assignments include travel paths 18, groupings, dump targets, entrance paths, exit paths, and other control aspects for the machines 12, and communicates this information to the different control modules 30 for individual implementation. As will be explained in more detail below, the worksite controller 38 may then manage movement of each haul machine 12b (and other machines 12) along the different travel paths to particular dump targets, and from dump targets back to other locations after discharge of material.

In particular, the worksite controller 38 can transmit instructions to the onboard controller 36 of each machine 12 and alter the current assignment of the machine. This may include communicating a new travel path, modifying a payload weight to be hauled, changing a machine speed, and changing a task to be performed. The instructions may also be assigning a machine 12 a new travel path and dispatching a second machine.

Each of the machines 12, including the mobile haul machines 12b, may include a plurality of tires 13. One or all of the tires 13 may further include a tire sensor 39 that is configured to monitor one or more tire conditions. Each tire sensor 39 is associated with a particular tire 13 and monitors tire conditions by measuring tire data. The tire data may include at least one of tire temperature and tire pressure. Tire temperature may include the internal air temperature in the tire and/or the tire temperature of the tire carcass. Tire pressure may also include the internal air pressure as measured from inside the tire or from the tire carcass.

In one embodiment, each of the tire sensors 39 are mounted to a wheel on the machine 12 that is associated with a tire 13. The tire sensor 39 extends through the wheel and into the interior of the tire 13 to gather the tire data. The tire data is transmitted to the onboard controller 36 using one of a wired or wireless signal. Each of the tire sensors 39 may include a wireless communications device 39c for wirelessly transmitting data to the onboard controller 36, either directly, via the communicating device 34, or via an intermediate tire sensor module 39b. The tire sensors 39 may alternatively be wired to the onboard controller 36 and communicate the tire data over a wired connection. In an embodiment, a combination of wireless and wired connections may be used to communicate tire data from the tire sensor 39 to the onboard controller 36.

An intermediate tire sensor module 39b may further be used to interrogate the tire sensors 39 and collect the tire data from each. The intermediate tire sensor module 39b may then communicate the tire data to the onboard controller 36, to the worksite controller 38, or to another remote computing system with a central processor 60. In the latter case, the intermediate tire sensor module 39b may have a second wireless communicating device for communicating over a wireless communication link that may be the same or different from the wireless communication link used between the worksite controller 38, the communicating device 34, and onboard controller 36.

Tire data may be sent and processed by a remote computing system separate from the worksite controller 38, the remote computing system having a central processor 60. Tire data can sent directly to the central processor 60 or sent indirectly through the worksite controller 38. The tire data is processed and instructions or inputs can be transmitted to the worksite controller 38 from the central processor 60. In one embodiment, the worksite controller 38 and the central processor 60 are collocated and may be integrated into a single computing system. In other embodiments, the two may be located remote from each other.

INDUSTRIAL APPLICABILITY

The disclosed system may be applicable to any work machine that includes tires. Although applicable to any type of machine, the disclosed system may be particularly applicable to autonomous or semi-autonomous machines where the machines are automatically controlled to follow particular routes and specific assignments. The disclosed system may provide instructions for controlling each machine along its assigned route, and for communicating the instructions in real time based on tracked machine position. Operation of system will now be described in detail.

Since tire condition can affect the cost, availability, and safety of work machines, managing tire condition to maximize tire life can yield significant benefits. This is particularly true if tires are managed over a fleet of machines. Task assignment based on tire condition ensures machine tires are maintained and their useful life is maximized. This can minimize down time, reduce safety hazards, and reduce replacement costs. In the context of autonomous and semi-autonomous work machines, efficient haul, route, and assignment selection can be used to manage tire condition for a fleet of machines.

Under normal machine operating conditions, temperature and pressure are key indicators of tire condition. Higher tire temperature and pressure indicates greater load on the tire and thus increased wear. Incorporation of these metrics into existing platforms using TKPH as a prediction of tire load improves accuracy of existing systems. Tire temperature and pressure can provide an instantaneous indication of tire load, which can then be converted into a TKPH value for use in the existing platform. Machines can then be assigned and reassigned using a more accurate tire load prediction, maximizing machine use (underutilization) and preventing instances of tire load overages (overutilization).

TKPH tire load has historically been used as a proxy for tire condition. TKPH gives the average energy that the tire must endure during a given assignment. In its simplest form, TKPH is the machine's average speed multiplied by the average load on each tire. The average load is often calculated per axle and/or per machine. TKPH can also be configured as a rolling cumulative value for a given work cycle. Typically a maximum TKPH value is set that cannot be exceeded by the system. This maximum value is set based on the TKPH rating of the tire given by the manufacturer and after taking into account various adjustment parameters.

TKPH is a metric that is embedded in many assignment systems. Machines that have registered a high TKPH (e.g., high tire load) from previous assignments are assigned routes that involve shorter haul routes, and vice versa as part of assignment optimization. However, tracking TKPH history and using it to determine future machine assignment may be inferior when compared to the accuracy of measuring tire condition directly by tire temperature and pressure. The present disclosure uses direct temperature and pressure measurements to obtain an instantaneous snapshot of tire condition. Measured values are converted into TKPH and TKPH is used for projection of the future tire condition for subsequent assignments.

Figure 3:
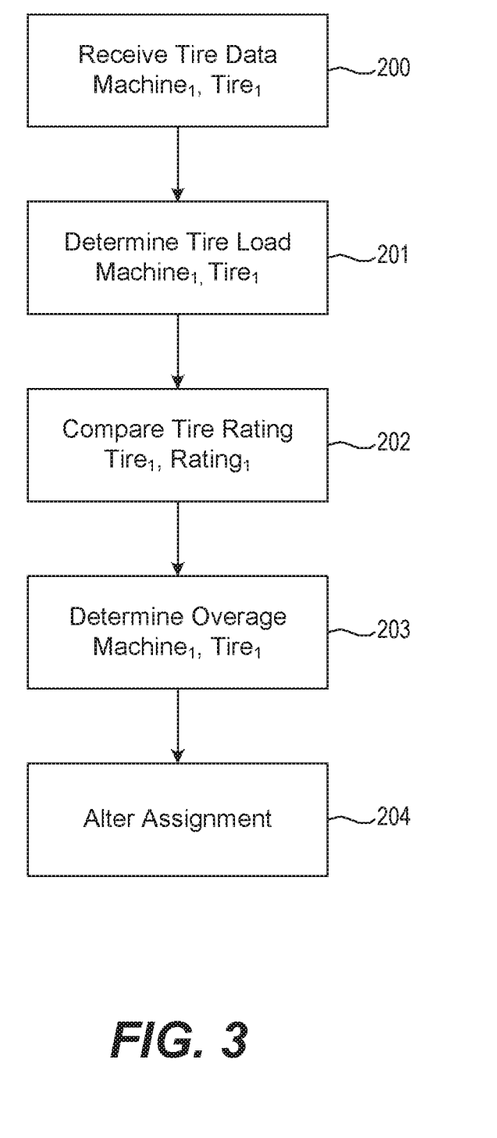
FIG. 3 is a flowchart depicting an exemplary method of managing a plurality of machines.

As shown in FIG. 1-3 and as described above, the system of the present disclosure includes a plurality of machines 12 (in some embodiments a haul machine 12b), each having a control module 30. Each machine 12 includes a tire sensor 39 associated with a tire 13 on the machine 12, the tire sensor measuring tire data including at least one of tire temperature and tire pressure. The worksite controller 38 is in communication with the control modules 30 of the machines 12, where the worksite controller 38 is configured to generate a travel path 18, including new travel paths, for each machine 12 between a first location 14 and a second location 16. The worksite controller 38 is also configured to selectively communicate the travel path 18 (including new travel paths) to each of the control modules 30.

Figure 5:
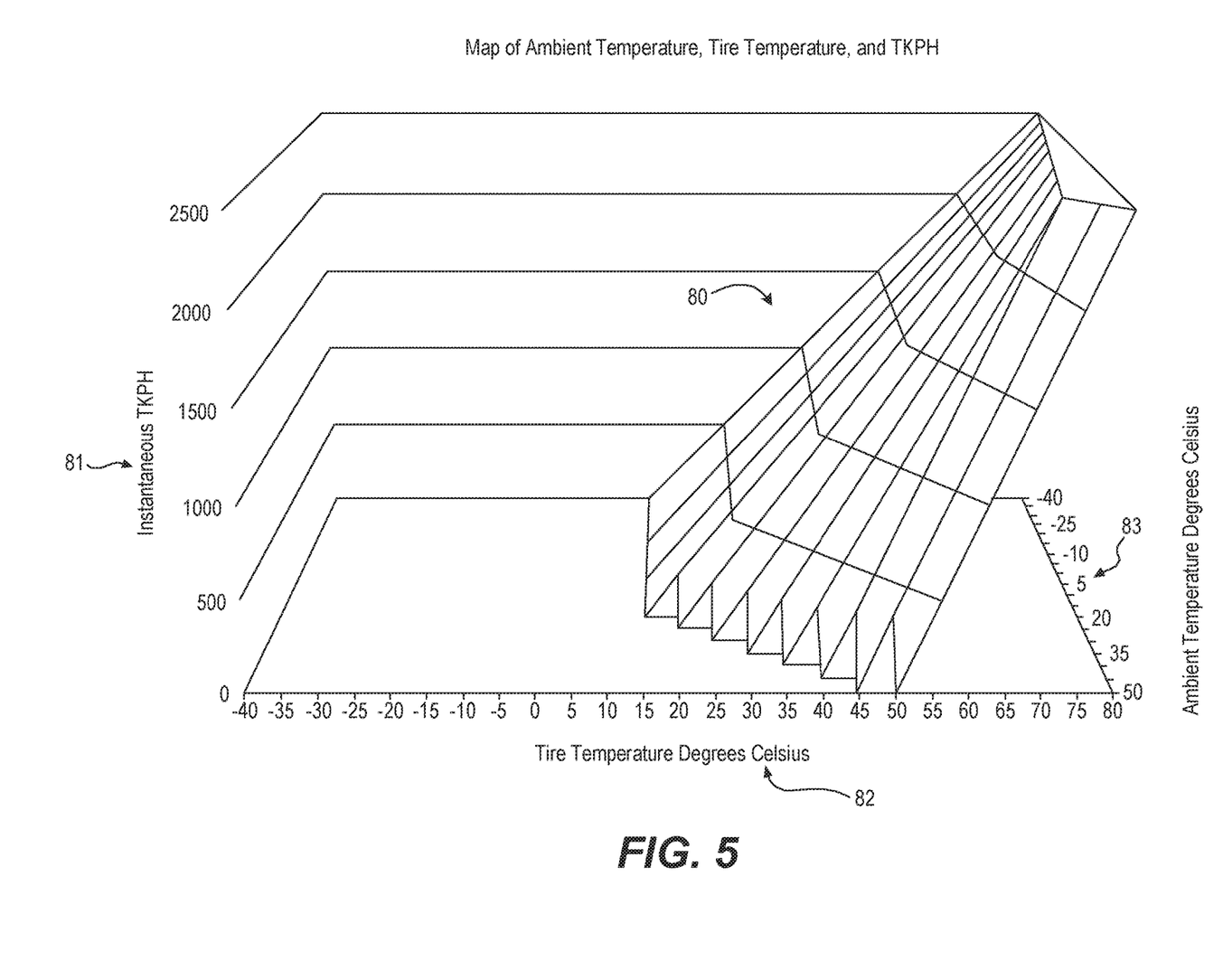
FIG. 5 is an exemplary map of tire load vs. tire temperature vs. ambient temperature.

With reference to the flow chart of FIG. 5, onsite or remote from the worksite controller 38 is a central processor 60 in communication with the worksite controller 38. The central processor 60 may be integrated into the worksite controller 38 or may be remote to the worksite controller 38. The central processor 60 is configured to receive the tire data (Step 200) and use the tire data to determine a tire load for each tire (Step 201) on the machine 12. The central processor 60 can receive the tire data directly from the machine 12 or indirectly via the worksite controller 38.

The central processor compares the tire load for each tire against a tire rating (Step 202), and determines whether the tire rating will be exceeded on a current assignment (Step 203). The current assignment may include a given travel path 18 and/or task to be completed by the machine 12. Based on the comparison of the tire load to the tire rating for each tire 13 on the machine 12, the central processor 60 can communicate with the worksite controller 38 to alter the current assignment of one or more of the machines 12 to prevent tire load overages (Step 204).

The tire data can be acquired from the machine 12 and for each tire 13 periodically or continuously. In an embodiment, the central processor 60 receives tire data at specific intervals and at certain task events (Step 200). These task events may include, for a haul machine 12b for instance, dumping events and loading events.

The tire data from the tire sensors 39 is used to determine tire load. Tire data is one or more of tire temperature and tire pressure measured by the tire sensor 39. To determine tire load and to continue using TKPH for future estimates of tire load for each machine 12, the tire temperature and/or tire pressure are converted to TKPH values. The central processor 60 is configured to determine tire load in terms of TKPH by comparing the temperature data to a map of tire load versus tire temperature and ambient temperature, and/or by comparing the pressure data to a map of tire load versus tire pressure and ambient pressure (Step 201).

As shown in FIG. 5, an exemplary map 80 of tire temperature 82, tire load in TKPH 81, and ambient temperature 83 is shown. This map 80 converts the temperature data into TKPH tire load 81. An alternate map is utilized for mapping tire pressure data to tire load in TKPH and ambient pressure. In an embodiment, the map 80 is created using a linear interpolation between tire temperature at the maximum TKPH rating and TKPH rating at ambient temperature 83. A threshold ambient temperature is provided by the tire manufacturer and is used as a lower bound on the map. The threshold ambient temperature is the ambient temperature in which the tire begins to take on or give off heat. TKPH rating increases or decreases above and below this threshold.

Ambient temperature can be determined by monitors at the worksite 10, by measurements taken by operators, or by any other means suitable for determining the ambient temperature on a given day. Ambient temperature is an input into the system that ensures the tire temperature and tire pressure are being mapped accurately.

Figure 4:
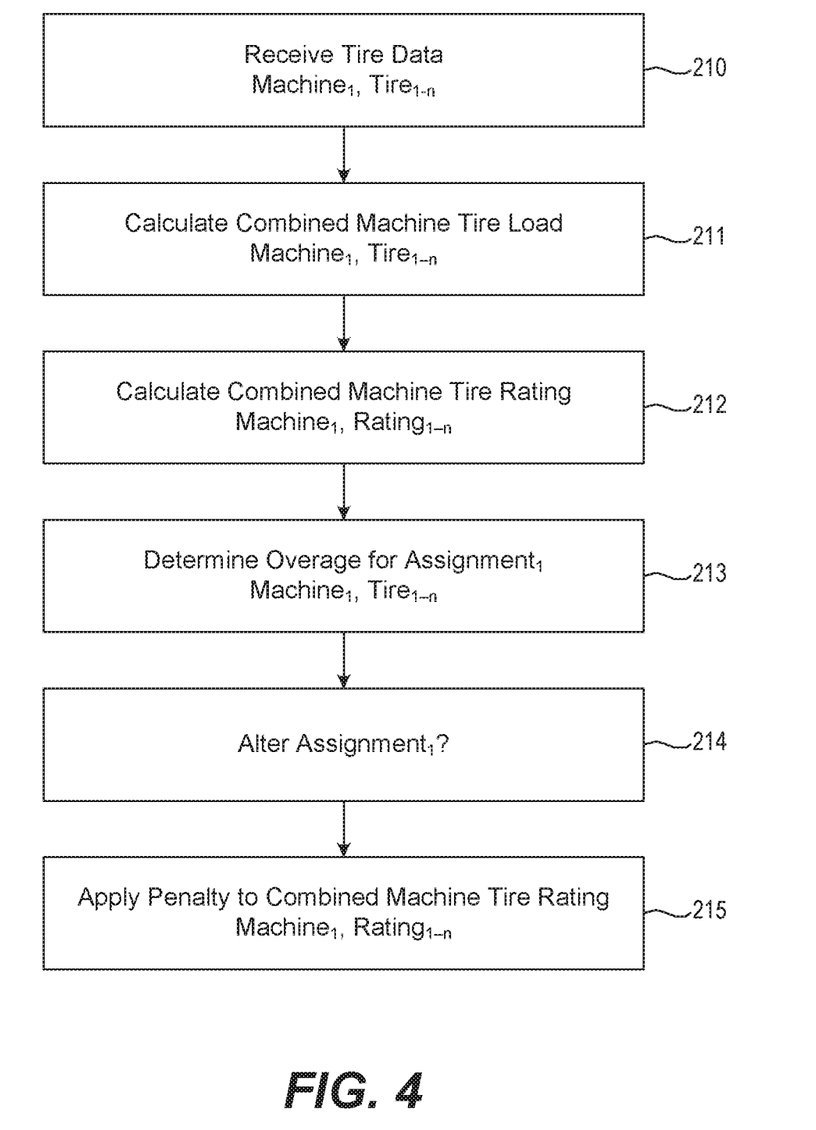
FIG. 4 is another flowchart depicting the method of managing a plurality of machines.

As shown in FIG. 4, the worksite controller 38 can alter the assignment of the machines 12 based on individual and combined machine tire loads. In particular, a maximum projected TKPH value for an individual tire 13 can be used to force a reassignment for that machine 12. Alternatively, the average TKPH rating for the machine across all tires or across particular axles on the machine 12 can be used to drive reassignment.

For combined TKPH rating a machine 12 and as shown in FIG. 4, tire data is first received for a particular machine 12 and its one or more tires 13 (Step 210). The central processor 60 calculates a combined tire load for the machine 12 based on the tire load of all tires 13 on the machine 12 (Step 211). A combined tire rating for the machine 12 is calculated based on the tire rating of the all tires 13 on the machine 12 (Step 212). The central processor 60 then determines whether the combined tire rating will be exceeded on a current assignment (Step 213). If a tire load overage for the given assignment is determined (Step 213), the assignment may be altered (Step 214). A penalty factor may also be applied to the combined tire rating of the machine 12 for subsequent, future assignments (Step 215).

The penalty factor reduces the combined TKPH rating of the machine 12 so the worksite controller 38 may choose machines 12 with better tire conditions for particular assignments. This may continue across a machine fleet, thereby maximizing tire use and tire condition across all machines 12, while avoiding individual overages unless necessary. Assignments for machines 12 with tires 13 approaching their combined TKPH rating may including placement into a non-operational status or being giving tasks with reduced payload to compensate for the tire condition of the machine 12. Additional machines 12 may also be assigned to replace those machines 12 approaching their combined TKPH rating.

Tire data from each tire sensor 39 may be tagged with various data and stored by the central processor 60. The tagged data may include the tire type and location, its location on the machine 12, a timestamp of each update, the company owning each machine, the particular worksite 10, and any other data that may be necessary for logging tire data and creating a usable database.

Several advantages over the prior art may be associated with the system of the present disclosure. One advantage includes providing an instantaneous TKPH tire load value based on measured data directly at the tire (e.g., tire pressure and/or tire pressure). Another advantage includes obtaining more accurate prediction of tire load overages by having real-time TKPH tied to actual vehicle metrics. Yet another advantage is having the ability to maximize machine use across an entire fleet and avoid underuse by conservative TKPH approximations. Finally, the system of the present disclosure can be readily integrated into legacy systems employing TKPH for monitoring tire load.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A method of managing a plurality of machines, comprising:
    receiving tire data associated with a tire sensor on a machine over a network, the tire sensor being associated with a tire on the machine and the tire data including at least one of tire temperature and tire pressure;
    determining a tire load for the tire using one of a relationship between the tire load, the tire temperature, and ambient temperature, or a relationship between the tire load, the tire pressure, and ambient pressure;
    comparing the tire load for the tire against a tire rating for the tire;
    determining, based on the comparison, whether the tire rating will be exceeded on a current assignment; and
    altering the current assignment of the machine in response to determining that the tire load will exceed the tire rating.

2. The method of claim 1, wherein the machine is an autonomous or semi-autonomous machine.

3. The method of claim 1, wherein the step of altering the current assignment of the machine includes at least one of communicating a new travel path, modifying a payload weight, changing a machine speed, and changing a task to be performed.

4. The method of claim 3, wherein the step of altering the current assignment of the machine includes communicating a new travel path for the machine and dispatching a second machine.

5. The method of claim 3, wherein the step of altering the current assignment of the machine includes using a worksite controller to communicate a new travel path for the machine.

6. The method of claim 1, further including:
    calculating a combined tire load for the machine based on the tire load of all tires on the machine;
    calculating a combined tire rating for the machine based on the tire rating of the all tires on the machine;
    determining whether the combined tire load will exceed the combined tire rating on a current assignment; and
    applying a penalty factor to the combined tire rating of the machine for a future assignment.

7. The method of claim 3, wherein tire load is a ton kilometer per hour (TKPH) value.

8. The method of claim 3, wherein the tire load for the tire is determined at a remote location relative to the machine.

9. A system for managing a plurality of machines, comprising:
    a plurality of machines, each having a control module;
    a tire sensor associated with a tire on each of the plurality of machines, the tire sensor measuring tire data including at least one of tire temperature and tire pressure;
    a worksite controller in communication with each control module, the worksite controller configured to:
        generate a travel path for the plurality of machines between a first location and a second location; and
        selectively communicate the travel path to each of the control modules;
    a central processor in communication with the worksite controller, the central processor being configured to:
        receive the tire data and compare the tire temperature to a map of tire load versus tire temperature and ambient temperature to determine a tire load for each tire;
        compare the tire load for each tire against a tire rating; and
        determine whether the tire rating will be exceeded by the tire load on a current assignment,
    wherein the worksite controller is configured to generate a new travel path for at least one of the plurality of machines such that the tire rating will not be exceeded by the tire load.

10. The system of claim 9, wherein:
    the central processor is further configured to compare the tire pressure to a map of tire load versus tire pressure and ambient pressure to determine the tire load.

11. The system of claim 9, wherein tire load is a ton kilometer per hour (TKPH) value.

12. The system of claim 9, wherein the central processor and worksite controller are located in one or more remote locations relative to the plurality of machines.

13. The system of claim 9, further including:
    a communicating device on each of the plurality of machines; and
    the communicating device configured to communicate over a network to the worksite controller.

14. The system of claim 9, wherein the plurality of machines includes a plurality of autonomous or semi-autonomous machines.

15. The system of claim 9, wherein the central processor is further configured to:
    calculate a combined tire load for one or more of the plurality of machines based on the tire load of all tires on the machine;
    calculate a combined tire rating for the machine based on the tire rating of the all tires on the machine;
    determine whether the combined tire load will exceed the combined tire rating on a current assignment; and
    apply a penalty factor to the combined tire rating of the machine for a future assignment.

16. A method of managing a plurality of machines, comprising:
    receiving tire data associated with a tire sensor on a machine over a network, the tire sensor being associated with a tire on the machine and the tire data including at least one of tire temperature and tire pressure;

determining a tire load for the tire using one of:
  a map relating tire load to the tire temperature and ambient temperature, or
  a map relating tire load to the tire pressure and ambient pressure,
  wherein tire load is a ton kilometer per hour (TKPH) value;

comparing the tire load for the tire against a tire rating for the tire; and determining whether the tire rating will be exceeded by the tire load on a current assignment; and altering the current assignment of the machine in response to determining that the tire rating will be exceeded by the tire load.

17. The system of claim 16, further including:

calculating a combined tire load for the machine based on the tire load of all tires on the machine;

calculating a combined tire rating for the machine based on the tire rating of the all tires on the machine;

determining whether the combined tire load will exceed the combined tire rating on a current assignment; and applying a penalty factor to the combined tire rating of the machine for a future assignment.

* * * * *